(12) United States Patent
Garner (10) Patent No.: US 10,920,905 B2
(45) Date of Patent: Feb. 16, 2021

(54) UNIVERSAL FATIGUE VALVE SYSTEM

(71) Applicant: TREK BICYCLE CORPORATION, Waterloo, WI (US)

(72) Inventor: Patrick Dean Garner, Reeseville, WI (US)

(73) Assignee: TREK BICYCLE CORPORATION, Waterloo, WI (US)

( * ) Notice: Subject to any disclaimer, the term of this patent is extended or adjusted under 35 U.S.C. 154(b) by 124 days.

(21) Appl. No.: 16/358,186

(22) Filed: Mar. 19, 2019

(65) Prior Publication Data

US 2020/0300381 A1 Sep. 24, 2020

(51) Int. Cl.

| | |
|---|---|
| *F16K 31/52* | (2006.01) |
| *F16K 31/524* | (2006.01) |
| *F16K 11/07* | (2006.01) |
| *F16K 3/26* | (2006.01) |
| *F16K 15/14* | (2006.01) |
| *F16K 3/20* | (2006.01) |
| *F16K 3/18* | (2006.01) |

(52) U.S. Cl.
CPC .......... *F16K 31/52483* (2013.01); *F16K 3/26* (2013.01); *F16K 11/0716* (2013.01); *F16K 3/184* (2013.01); *F16K 3/205* (2013.01); *F16K 15/14* (2013.01); *F16K 31/52* (2013.01); *F16K 31/524* (2013.01)

(58) Field of Classification Search
CPC .. F16K 31/52483; F16K 31/52; F16K 31/524; F16K 3/26; F16K 3/184; F16K 3/205; F16K 11/0716; F16K 15/14

USPC ........... 137/625.69, 530; 251/251, 254, 258, 251/261, 259, 260; 74/10.6, 838, 22 A, 74/567

See application file for complete search history.

(56) References Cited

U.S. PATENT DOCUMENTS

| | | | | |
|---|---|---|---|---|
| 1,369,007 | A * | 2/1921 | Casey et al. | B61C 17/02 251/251 |
| 1,567,537 | A * | 12/1925 | Mockus | F16K 31/523 137/625.33 |
| 1,612,406 | A * | 12/1926 | Weisgerber | F16K 3/26 137/625.38 |
| 3,802,075 | A * | 4/1974 | Taylor | A01G 3/053 30/216 |
| 5,460,201 | A | 10/1995 | Borcea et al. | |
| 5,732,678 | A * | 3/1998 | Lindquist | F01L 9/02 123/446 |
| 6,170,159 | B1 * | 1/2001 | Kramer | A01G 3/053 30/216 |
| 7,788,811 | B2 * | 9/2010 | Hanada | A01G 3/053 30/216 |
| 7,811,064 | B2 * | 10/2010 | Allen | F04B 49/126 417/218 |

(Continued)

*Primary Examiner* — Minh Q Le (74) *Attorney, Agent, or Firm* — Bell & Manning, LLC; Christopher Kalafut (57) ABSTRACT

A valve system includes a cam that has a shaft portion with an opening configured to receive a motor shaft, where the opening is off-center within the shaft portion. The system also includes a connecting rod assembly mounted to the shaft portion of the cam, where the connecting rod assembly includes a flexible one-piece connecting rod. The system further includes a valve mounted to an end of the flexible one-piece connecting rod such that rotation of cam results in translation of the valve.

20 Claims, 9 Drawing Sheets

(56) References Cited

U.S. PATENT DOCUMENTS

| | | | |
|---|---|---|---|
| 8,011,273 B2* | 9/2011 | Kobayashi | F16H 49/001 |
| | | | 74/640 |
| 2009/0020717 A1* | 1/2009 | Min | F16K 31/047 |
| | | | 251/251 |
| 2015/0184773 A1* | 7/2015 | Hermann | F16K 31/52483 |
| | | | 251/251 |

* cited by examiner

UNIVERSAL FATIGUE VALVE SYSTEM

BACKGROUND

Fatigue testing is performed to determine the behavior of materials or systems under constant or fluctuating loads. In some forms of fatigue testing, a mean load and an alternating load are applied to a material/system being tested for a large number of test cycles. The testing may continue until the point at which a failure occurs in the material/system being tested. As an example, fatigue testing can be performed on a bicycle frame to determine how different loads and stresses on the frame affect performance and longevity. Fatigue testing can similarly be performed on automotive parts, building materials, cloths, etc.

SUMMARY

An illustrative valve system includes a cam that has a shaft portion with an opening configured to receive a motor shaft, where the opening is off-center within the shaft portion. The system also includes a connecting rod assembly mounted to the shaft portion of the cam, where the connecting rod assembly includes a flexible one-piece connecting rod. The system further includes a valve mounted to an end of the flexible one-piece connecting rod such that rotation of cam results in translation of the valve.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Described herein is a fatigue testing system and a universal fatigue valve assembly for use in the fatigue testing system. As discussed in detail below, the proposed design uses a servo motor with a cam and a living hinge to optimize the cycle-speed of pneumatically generated loads. In an illustrative embodiment, a proportional-integral-differential (PID) loop is used to control the valve, based on the applied load, for consistent load output. Additionally, the valve described herein is designed for normal, industrial air filtration, opposed to other voice coil valves requiring air filtration through a coalescing filter rated to 0.01 parts per million (ppm).

The proposed fatigue testing system was designed to optimize various system parameters, including durability, high resolution of valve movement, and high transition speed while opening and closing the valve. To maximize durability, the proposed fatigue testing system was designed to be unaffected by normal contamination present in industrial compressed air lines. Resolution and transition speed are mutually exclusive design considerations. Resolution of the system can be defined by the number of discrete points that can be set in the motor rotation from valve closed to valve fully open. The more motor rotation involved to achieve the desired position, the better the resolution of the system. The resolution is important for repeatable, accurate load control. Regarding speed, the further the motor has to rotate to reach a desired position, the longer the transition time. Faster transitions allow for tests to be completed in less time. The design considerations and proposed solutions are described in more detail with reference to FIGS. 6-7.

The proposed fatigue testing system includes a motor driven valve that is used to direct compressed air for imposing a load on a sample being tested. The motor, which can be any type of motor, includes a bi-directionally rotating shaft. Mounted to the bi-directionally rotating shaft is a cam, and mounted to the cam via a pre-loaded ball bearing is a connecting rod. The connecting rod is connected to a valve body (or piston) that is positioned in a valve block. As the bi-directionally rotating shaft moves along with the cam, the connecting rod mounted to the cam also moves, causing the valve body to translate within the valve block.

Figure 1A:
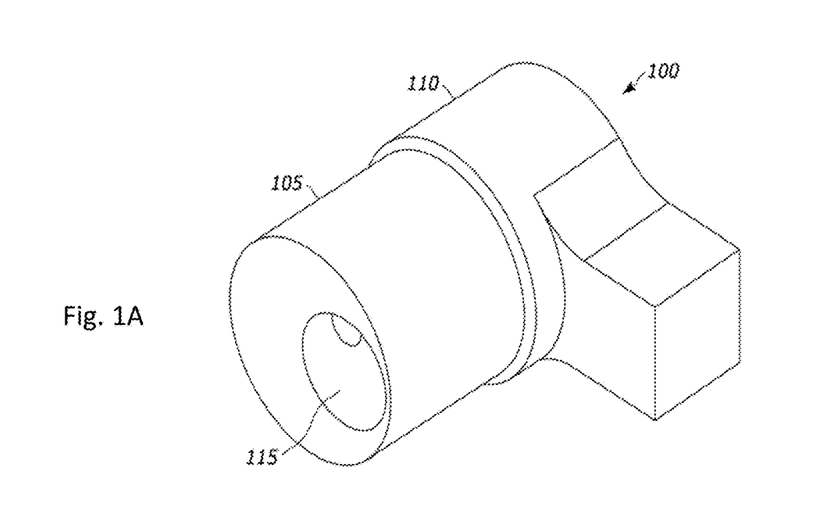
FIG. 1A is a perspective view of a cam for use in a fatigue valve system in accordance with an illustrative embodiment.
Figure 1B:
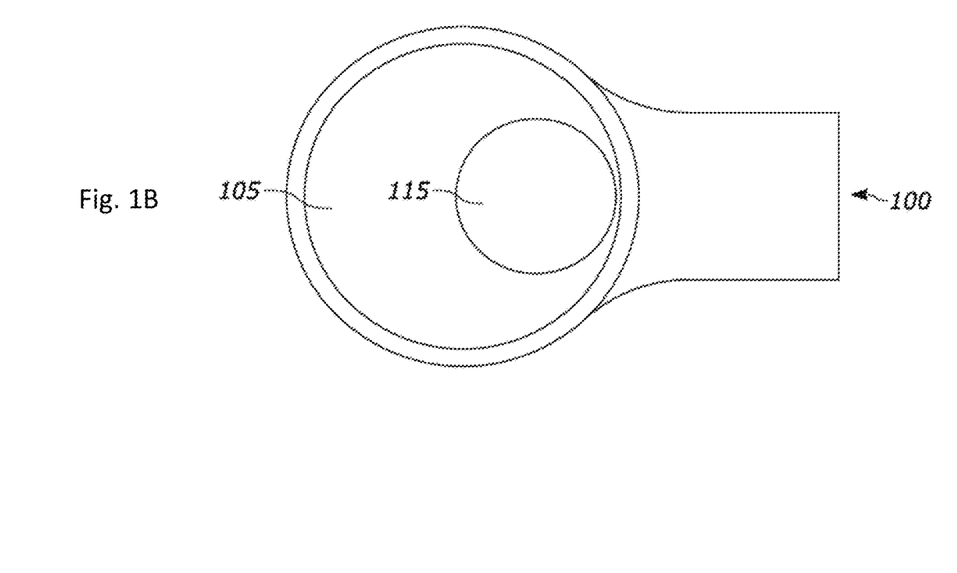
FIG. 1B is a front view of the cam in accordance with an illustrative embodiment.
Figure 1C:
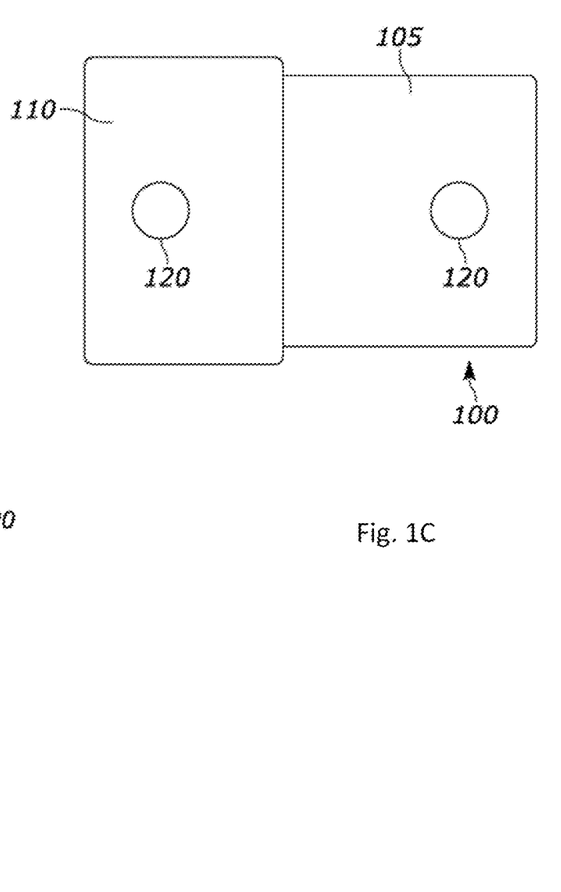
FIG. 1C is a side view of the cam in accordance with an illustrative embodiment.

FIG. 1A is a perspective view of a cam 100 for use in a fatigue valve system in accordance with an illustrative embodiment. FIG. 1B is a front view of the cam 100 in accordance with an illustrative embodiment. FIG. 1C is a side view of the cam 100 in accordance with an illustrative embodiment. As shown, the cam 100 includes a shaft portion 105 and a base portion 110 connected to the shaft portion 105. As also shown, the cam 100 includes an opening 115 that is configured to receive a motor shaft. In an illustrative embodiment, the opening 115 extends through an entire length of the cam 100. The opening 115 is positioned off center within the shaft portion 105 of the cam 100. Also depicted are mounting holes 120 that are used to secure the cam 100 to the motor shaft such that the cam 100 rotates in unison with the motor shaft. In an illustrative embodiment, the mounting holes 120 are threaded openings configured to receive threaded fasteners which either contact or penetrate the motor shaft.

Figure 2:
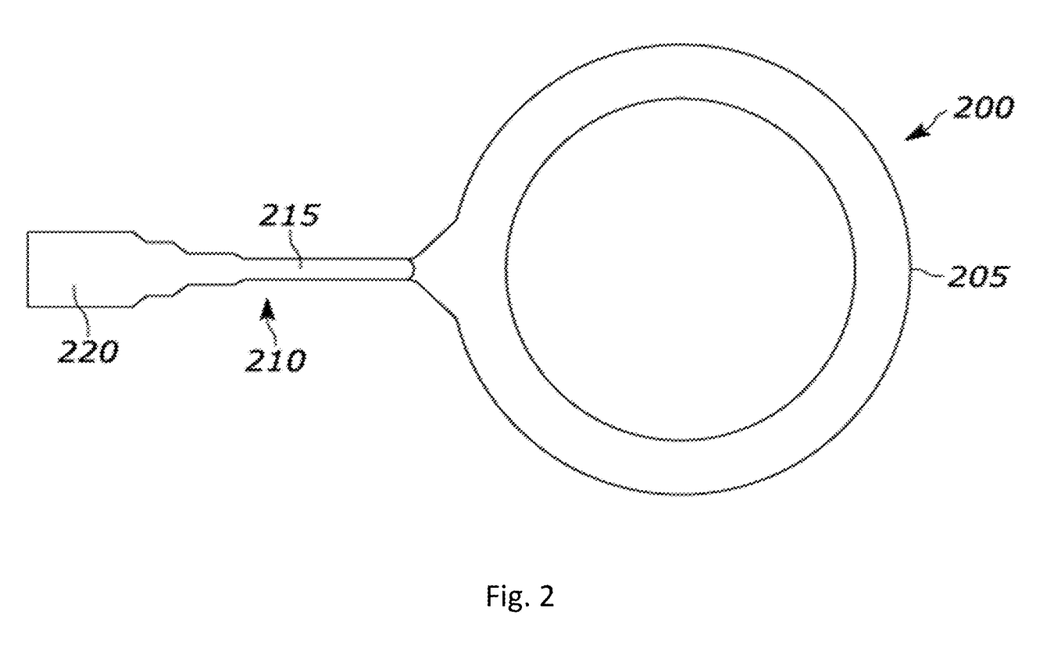
FIG. 2 depicts a connecting rod assembly for use in a fatigue valve system in accordance with an illustrative embodiment.

FIG. 2 depicts a connecting rod assembly 200 for use in a fatigue valve system in accordance with an illustrative embodiment. The connecting rod assembly 200 includes a ring 205 and a connecting rod 210. The ring 205 is configured to mount via press fit onto a pre-loaded ball bearing, which in turn mounts onto the shaft portion 105 of the cam 100 depicted in FIGS. 1A-1C. The connecting rod 210 includes a rod portion 215 and a connector portion 220, where the rod portion 215 is thinner than the connector portion 220. Additionally, a step portion of intermediate width (i.e., thinner than the connector portion 220 and thicker than the rod portion 215) forms a transition between the rod portion 215 and the connector portion 220. The connector portion 220 mounts to a valve in a valve block. In an illustrative embodiment, the center of the valve mount is offset from the center of the motor to minimize the flex and fatigue of the connecting rod assembly. In another illustrative embodiment, the connecting rod 210 is flexible such that it acts as a living hinge in response to bi-directional rotation of the cam to which it is mounted. As discussed in more detail below, as the connecting rod 210 flexes, the valve connected to the connector portion 220 is translated back and forth.

In an illustrative embodiment, the connecting rod 210 is made from a flexible plastic material such as nylon plastic. As a result, the system has low mass, which improves system speed (i.e., the less mass in the system, the faster it will move). Using the proposed system, a test that previously took 24 hours was reduced to 5.6 hours, which is a 77% test time reduction. As discussed in more detail below, the proposed valve allows the control system to quickly vary the air flow to the air cylinder, which enables the system to quickly and accurately achieve the desired load. Also, the closed center valve provides back pressure in the air cylinder, and the back pressure stabilizes the load faster, allowing the test to be performed at a higher cycle rate. Specifically, the proposed valve was able to operate at ~5 cycles/second as compared to 1.16 cycles/second for a traditional valve.

The use of a flexible one-piece connecting rod also minimizes play (i.e., unintended motion following rotation of the motor shaft) in the system. Play in the system introduced by a hinged or otherwise jointed connecting rod is undesirable because it decreases system accuracy, efficiency, and repeatability as compared to the proposed uniform (unjointed, unhinged) connecting rod. Using the proposed system, the accuracy of the load output increased ~210% as compared to a traditional valve system. The proposed connecting rod also provides for a long system life. In testing, the mean time between failure of the proposed connecting rod was in excess of 50,000,000 cycles. In alternative embodiments, a different type of flexible plastic or flexible non-plastic material may be used.

Figure 3A:
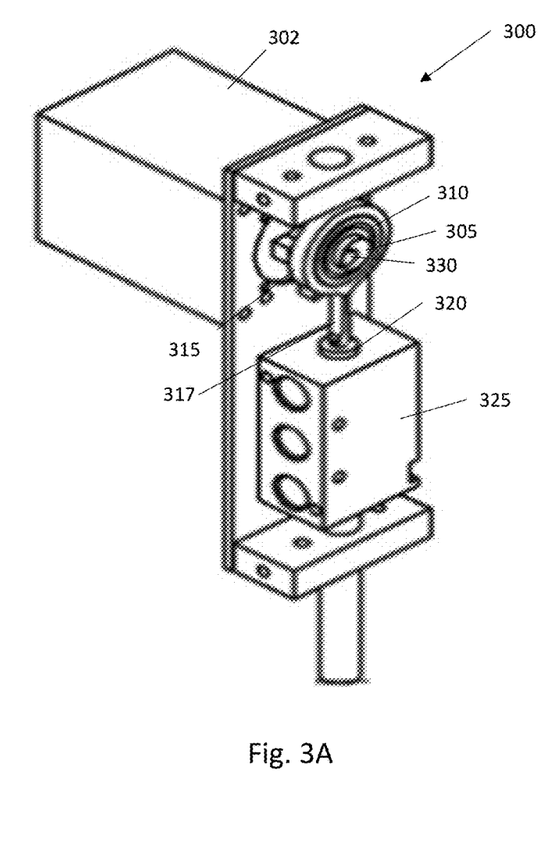
FIG. 3A is a perspective view of a fatigue valve system in accordance with an illustrative embodiment.
Figure 3B:
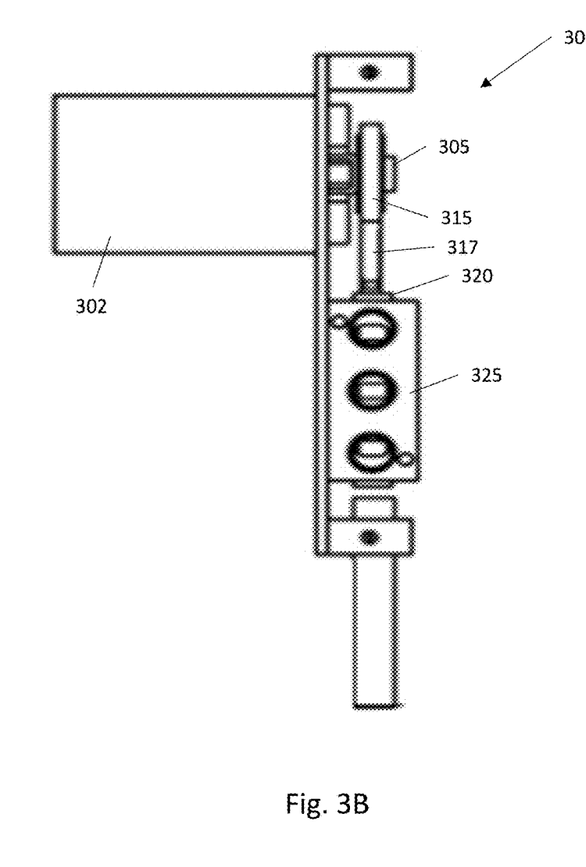
FIG. 3B is a side view of the fatigue valve system in accordance with an illustrative embodiment.

FIG. 3A is a perspective view of a fatigue valve system 300 in accordance with an illustrative embodiment. FIG. 3B is a side view of the fatigue valve system 300 in accordance with an illustrative embodiment. The fatigue valve system 300 includes a motor 302. Mounted to the motor 302 is a cam 305, and a ball bearing 310 and a connecting rod assembly 315 are mounted to a shaft portion of the cam 305. The connecting rod assembly is mounted to a valve 320, which is housed within a valve block 325. Not shown are air pressure tubes, etc. connected to the inlet/outlet ports of the valve block 325. The motor 302 is used to bi-directionally rotate a motor shaft 330. As shown, the cam 305 is mounted to the motor shaft 330 such that the motor shaft 330 is positioned off-center within the shaft portion of the cam 305. As a result, bi-directional rotation of the motor shaft 330 causes a connecting rod 317 of the connecting rod assembly 315 to flex, thereby translating the valve 320 in and out of the valve block 325.

In an illustrative embodiment, the motor shaft 330 is configured to start at 0°, rotate a number of degrees in a first (e.g., positive) direction, and then rotate back through 0° and a number of degrees in the opposite (e.g., negative) direction. Alternatively, the directions may be reversed. As a result, the connecting rod 317 of the connecting rod assembly 315 flexes but does not break. In one embodiment, the number of degrees (relative to 0°) that the motor shaft 330 rotates in each direction can be between 53°-65°. In alternative embodiments, a different range may be used. In another illustrative embodiment, the motor shaft 330 can rotate between +/−63°. Alternatively, a different value may be used. Rotation of the motor shaft 330 and movement of the connecting rod assembly 315 is described in more detail below.

Figure 4A:
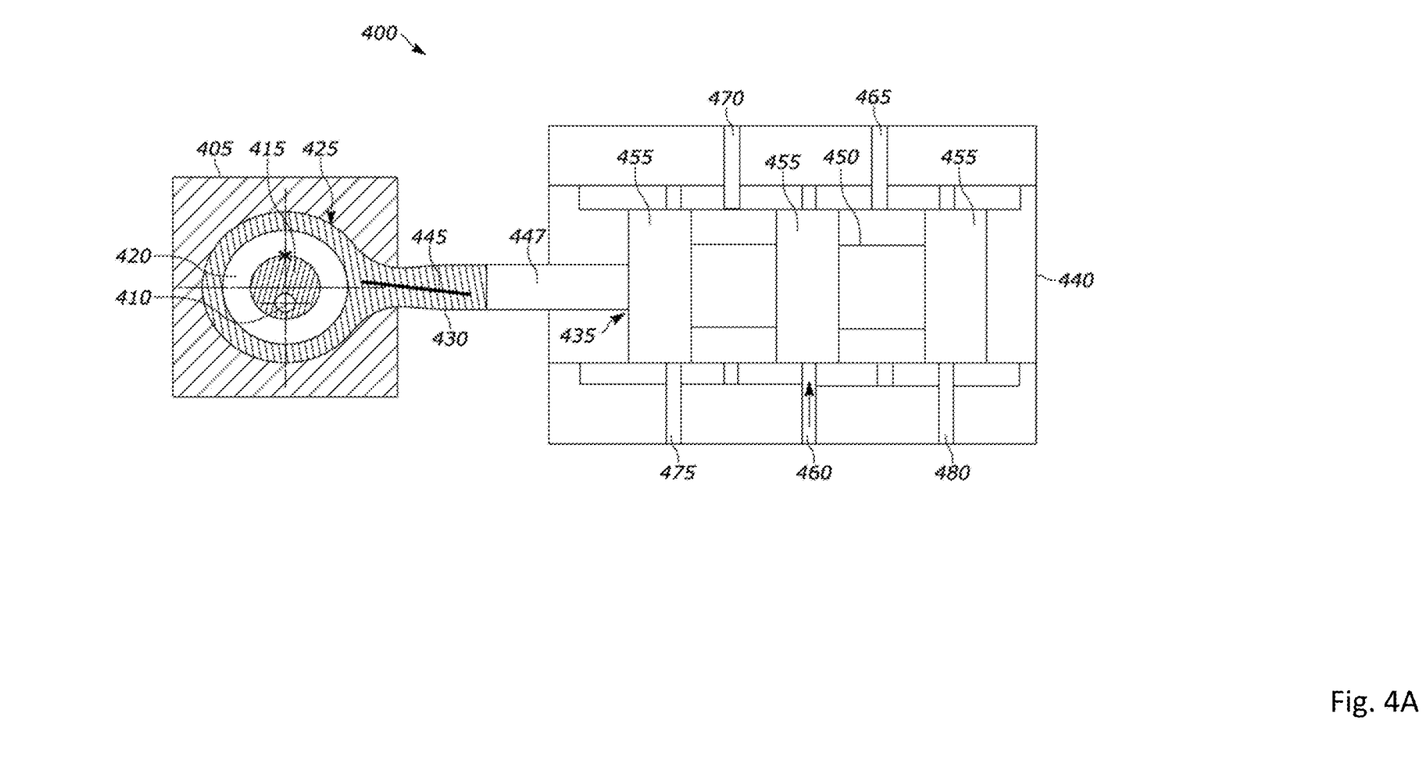
FIG. 4A is a cross-sectional view of a fatigue valve system in a closed configuration in accordance with an illustrative embodiment.
Figure 4B:
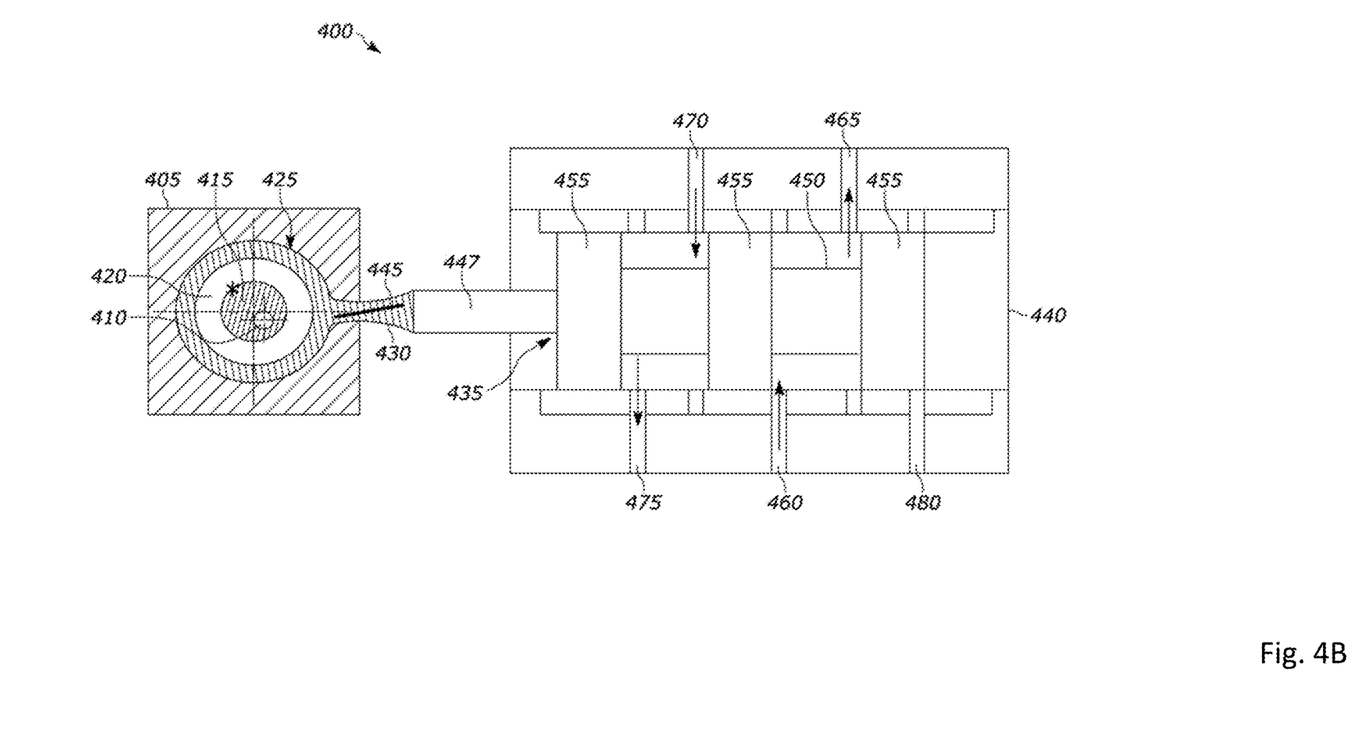
FIG. 4B is a cross-sectional view of the fatigue valve system in a first open configuration in accordance with an illustrative embodiment.
Figure 4C:
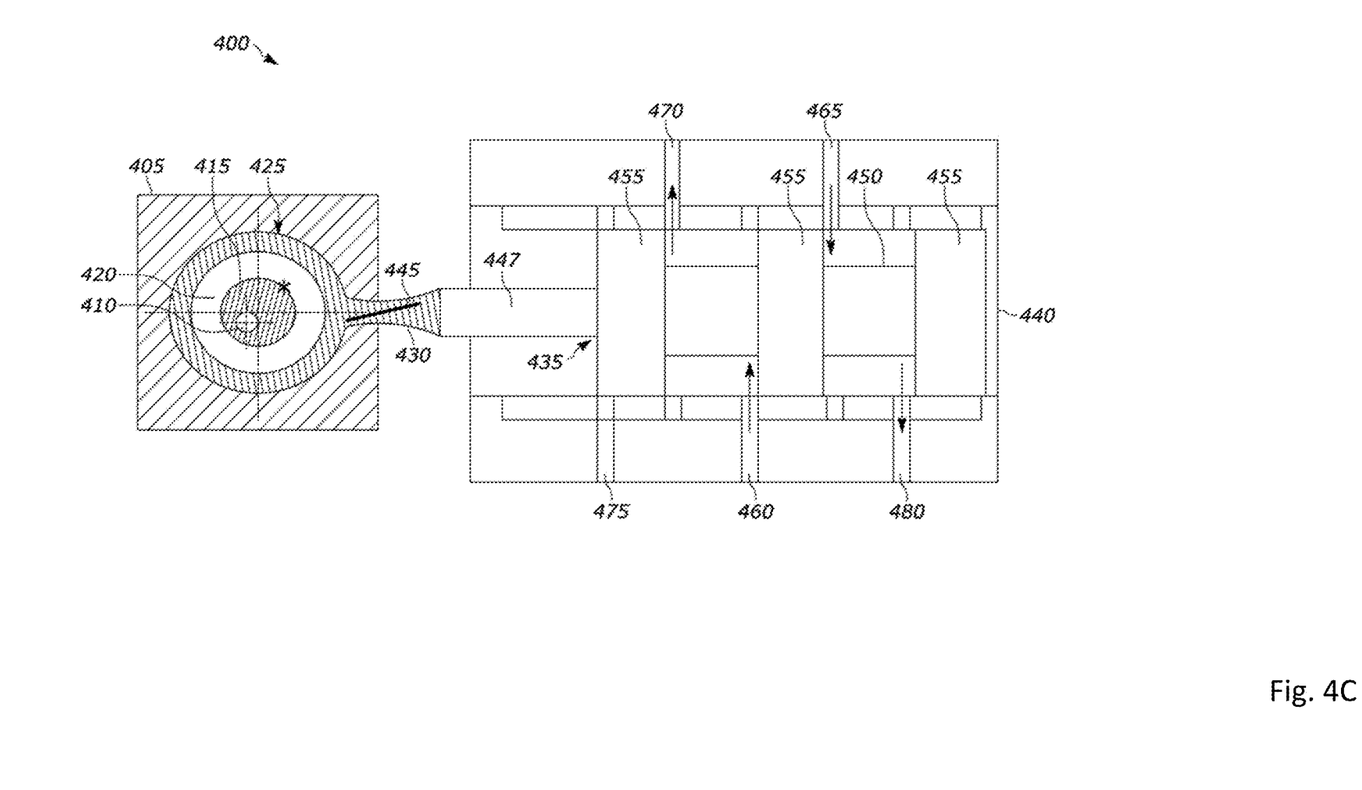
FIG. 4C is a cross-sectional view of the fatigue valve system in a second open configuration in accordance with an illustrative embodiment.

FIG. 4A is a cross-sectional view of a fatigue valve system 400 in a closed configuration in accordance with an illustrative embodiment. FIG. 4B is a cross-sectional view of the fatigue valve system 400 in a first open configuration in accordance with an illustrative embodiment. FIG. 4C is a cross-sectional view of the fatigue valve system 400 in a second open configuration in accordance with an illustrative embodiment. The fatigue valve system 400 includes a motor 405 with a motor shaft 410 that is configured to rotate bi-directionally. Mounted to the motor shaft is a cam 415, and mounted to the cam 415 are a ball bearing 420 and a connecting rod assembly 425. A connecting rod 430 of the connecting rod assembly 425 is mounted to a valve 435 that is housed in a valve block 440.

In FIG. 4A, the cam 415 is at a position of 0° as indicated by the star, and the connecting rod 430 is bent (or flexed) at a positive bend angle, as indicated by the line 445. The valve 435, which includes a valve shaft 447 mounted to the connecting rod 430, a valve body 450, and valve heads 455, is in a closed configuration in the depiction of FIG. 4A. Specifically, the valve 435 is positioned such that one of the valve heads 455 is blocking an inlet port 460 to the valve block 440. In an illustrative embodiment, the inlet port 460 is connected to a compressed air source (not shown).

In FIG. 4B, the cam 415 is at a position of −63° (as shown by the star) relative to the position depicted in FIG. 4A. As a result, the connecting rod 430 is flexed at a negative bend angle, as indicated by the line 445. The valve 435 is in a first open configuration. Specifically, the motion in the connecting rod 430 caused by rotation of the motor shaft 410 (and cam 415) by −63° draws the valve 435 further out of the valve block 440 (relative to the depiction of FIG. 4A) such that a valve head is no longer blocking the inlet port 460. As a result, compressed air from the inlet port 460 is able to travel up into a port 465 to actuate or impose a load upon a portion of the system, and exhaust occurs through ports 470 and 475.

In FIG. 4C, the cam 415 is at a position of +63° (as shown by the star) relative to the position depicted in FIG. 4A. As a result, the connecting rod 430 is again flexed at a negative bend angle, as indicated by the line 445. The valve 435 is in a second open configuration. Specifically, the motion in the connecting rod 430 caused by rotation of the motor shaft 410 (and cam 415) to the position of +63° pushes the valve 435 further into the valve block 440 (relative to the depiction of FIG. 4A) such that a valve head is no longer blocking the inlet port 460. As a result of this second open configuration, compressed air from the inlet port 460 is able to travel up into the port 470 to actuate or impose a load upon another portion of the system, and exhaust occurs through ports 465 and 480.

Figure 5:
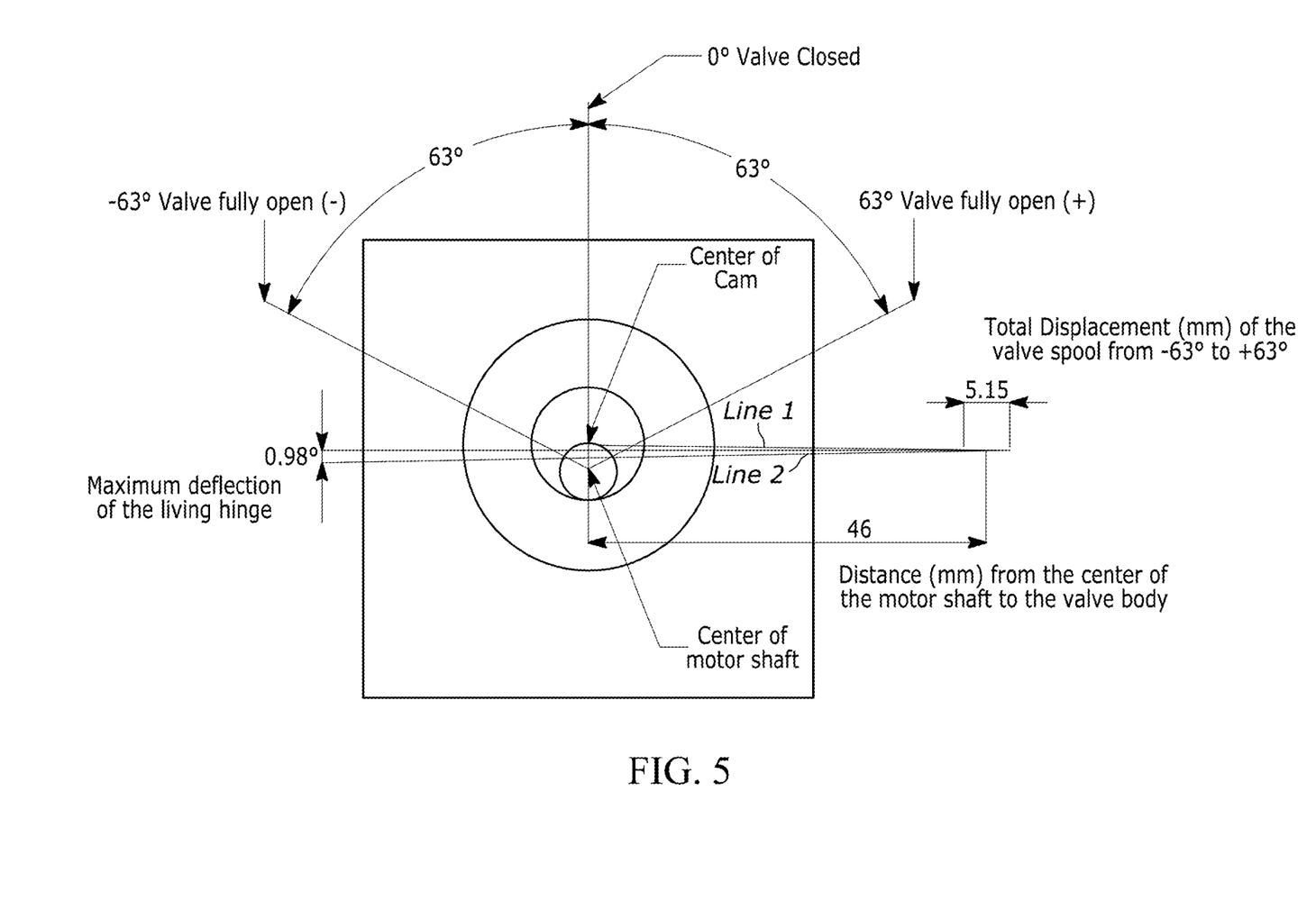
FIG. 5 illustrates detailed geometry of the cam relative to the closed position at 0° in accordance with an illustrative embodiment.

FIG. 5 illustrates detailed geometry of the cam relative to the closed position at 0° in accordance with an illustrative embodiment. In the embodiment of FIG. 5, the valve is fully open when the cam is rotated to +63° and −63°. In alternative embodiments, a different positive and/or negative angle may be used. An offset of the center of the motor from the valve shaft allows for no bend in the connecting rod at cam positions of about +43.4. As a result, the connecting rod will have a maximum bend of +0.98° when the cam is closed at 0° (Line 1) and a maximum bend of −0.98° when the cam is at ±63° (Line 2). This small amount of maximum bend helps to ensure durability of the connecting rod. In the embodiment of FIG. 5, the maximum travel of the valve shaft (as the cam rotates from +63° to −63°) is 5.15 millimeters (mm). In alternative embodiments, a different maximum travel value may be used.

Figure 6:
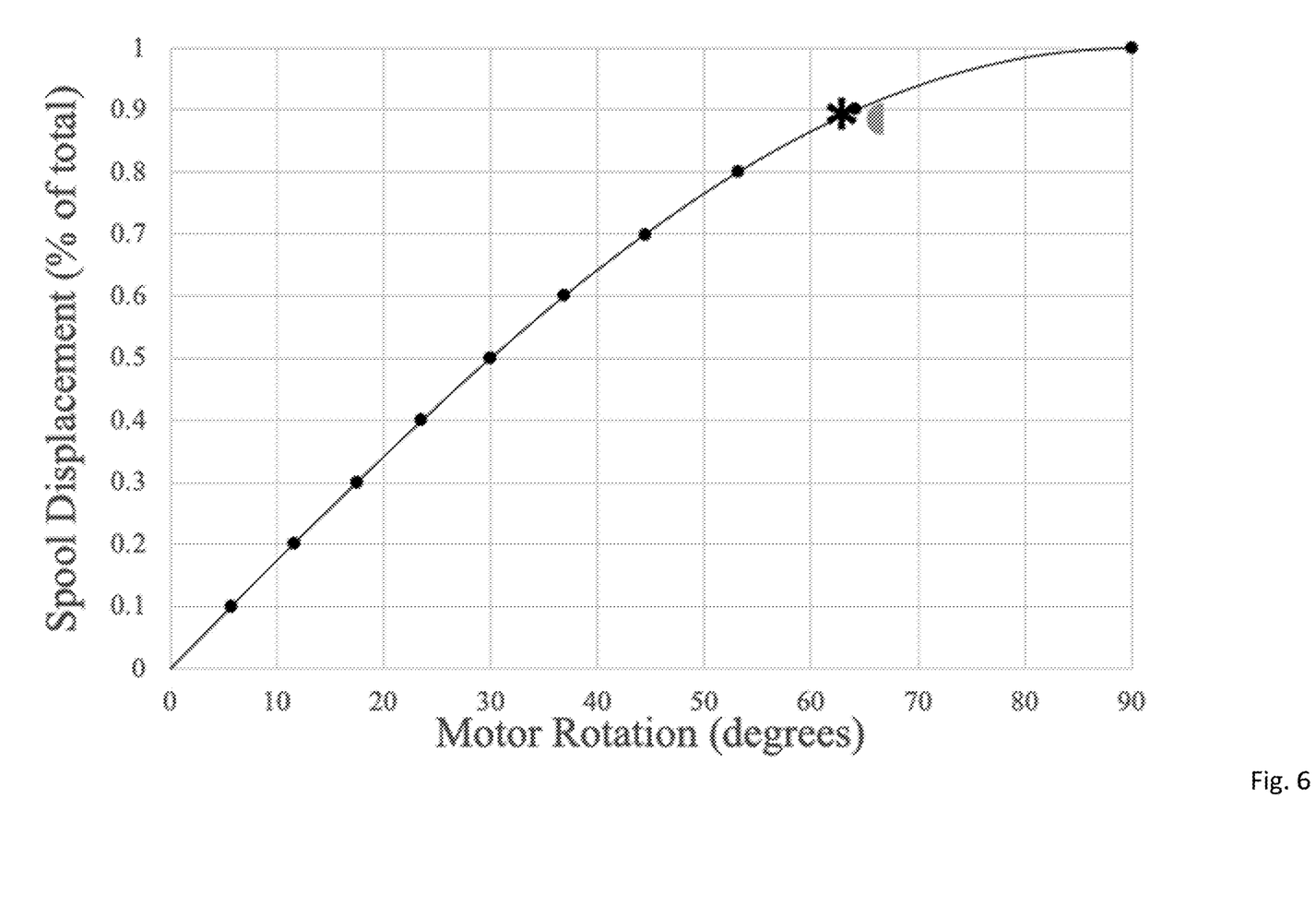
FIG. 6 depicts a chart that shows how much the valve spool (or shaft) would be displaced per degree of rotation from 0° degrees to 90° in accordance with an illustrative embodiment.

FIG. 6 depicts a chart that shows how much the valve spool (or shaft) would be displaced per degree of rotation from 0° degrees to 90° in accordance with an illustrative embodiment. In FIG. 6, valve spool displacement, which is shown as a percentage of total possible displacement, is plotted against motor rotation. The points reference every 10% of spool displacement, indicating the increasing requirement for motor rotation per spool displacement. Specifically, the greatest change in displacement is at the start of rotation (from 0 to 0.1°). As the valve continues to open it requires more motor rotation (and more time) to achieve the same valve displacement as the first 0.1° achieved.

Based on the chart of FIG. 6, it was determined that the optimum balance between high resolution and high speed is between ~53° and ~65° of maximum cam rotation in each direction relative to a 0° starting point. More specifically, it was determined that valve speed degrades rapidly above 65° and that significant resolution is lost below 53°. Additionally, the value of 63°, which is indicated with an asterisk, was identified as an optimal candidate rotation value to maximize both system speed and system resolution, which as discussed above are mutually exclusive design considerations. In alternative embodiments, a different value of maximum rotation may be used.

Figure 7:
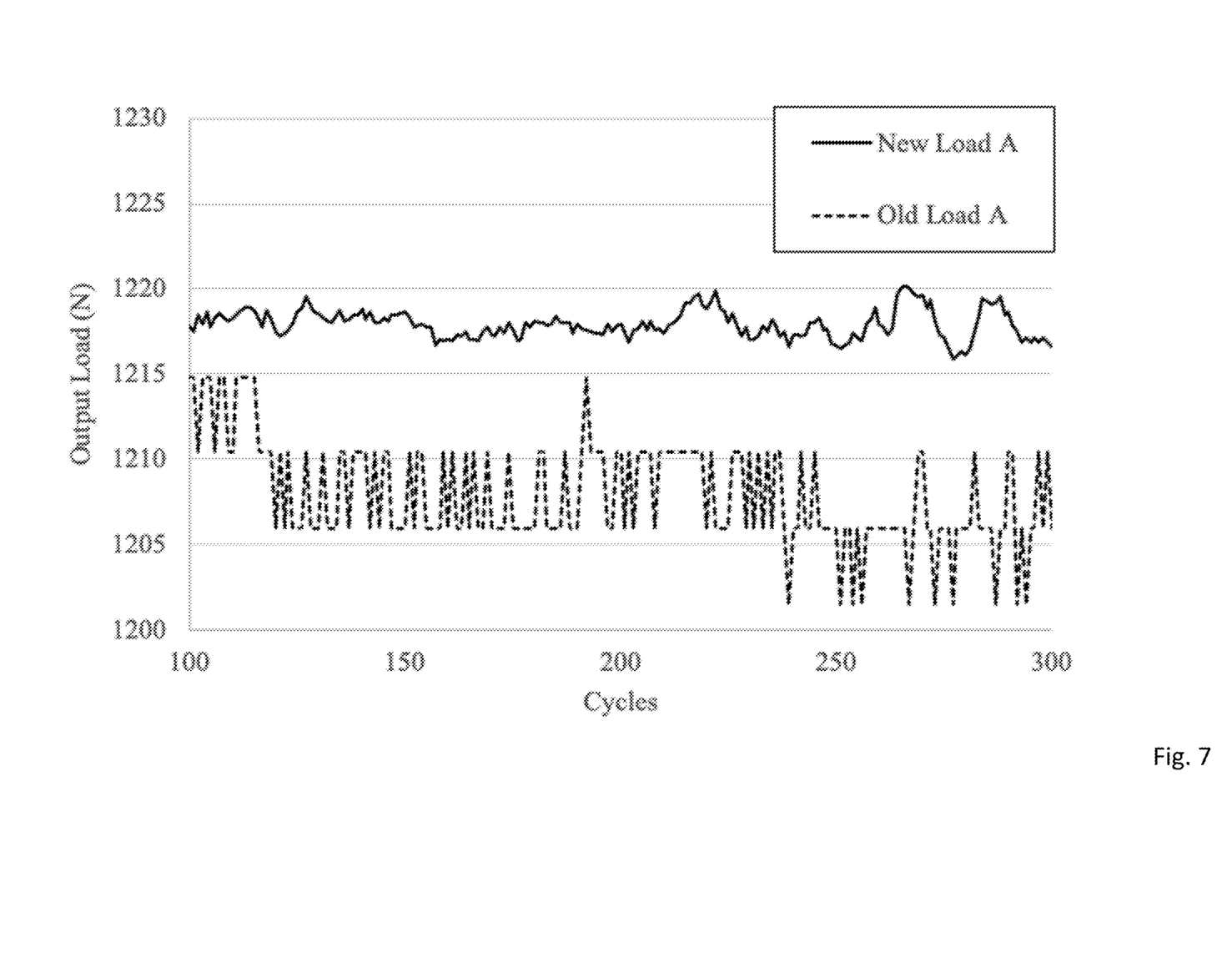
FIG. 7 depicts a chart which compares the accuracy of the load output for the proposed valve to a traditional valve in accordance with an illustrative embodiment.

FIG. 7 depicts a chart which compares the accuracy of the load output for the proposed valve to a traditional valve in accordance with an illustrative embodiment. The range of the old data, 13.4 Newtons (N), decreased to 4.3 N with the new valve. Ultimately, the accuracy of the load output increased 210%. Maintaining a smaller output range limits the potential for load output to extend past the desired load output range, thereby improving system reliability.

In an illustrative embodiment, the proposed valve is controlled by a proportional-integral-derivative (PID) controller. The PID controller, which can be implemented in hardware and/or software, is used to continuously calculate an error value that is the difference between the actual load delivered by the system and the desired load. At each iteration or loop, the PID controller applies a correction to the applied load in an effort to bring the actual load closer to the desired load. In one embodiment, a computing system that includes a processor, memory, interface, etc. can be used to implement and/or operate the PID controller. In another embodiment, any of the operations described herein can be implemented by the computing system. For example, operations performed by the proposed valve system can be stored in the memory of the computing system as computer-readable instructions. These operations can include the amount of motor rotation, the speed of motor rotation, the amount of air pressure applied to the inlet port of the valve, etc. Upon execution of the computer-readable instructions by the processor, the operations are performed.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A valve system comprising:
   a cam that includes a shaft portion with an opening configured to receive a motor shaft, wherein the opening is off-center within the shaft portion;
   a connecting rod assembly mounted to the shaft portion of the cam, wherein the connecting rod assembly includes a flexible one-piece connecting rod; and
   a valve mounted to an end of the flexible one-piece connecting rod such that rotation of the cam results in translation of the valve.

2. The valve system of claim 1, further comprising a ball bearing assembly mounted on an outer surface of the shaft portion of the cam.

3. The valve system of claim 2, wherein the ball bearing assembly is preloaded.

4. The valve system of claim 2, wherein the connecting rod assembly is mounted to an outer surface of the ball bearing assembly.

5. The valve system of claim 4, wherein the connecting rod assembly includes a ring portion that is integral with the flexible one-piece connecting rod, and wherein the ring portion is mounted to the outer surface of the ball bearing assembly.

6. The valve system of claim 1, wherein the connecting rod assembly is made of plastic.

7. The valve system of claim 6, wherein the plastic comprises a nylon plastic.

8. The system of claim 1, wherein the flexible one-piece connecting rod includes a rod portion and a connector portion, and wherein the rod portion is thinner than the connector portion.

9. The system of claim 8, wherein the flexible one-piece connecting rod also includes a step portion that forms a transition between the rod portion and the connector portion.

10. The system of claim 1, further comprising a motor that includes the motor shaft, wherein the motor is configured to rotate the motor shaft bi-directionally.

11. The system of claim 10, wherein the motor rotates the motor shaft for a first number of degrees in a first direction relative to a starting position and for a second number of degrees in a second direction relative to the starting position.

12. The system of claim 11, wherein rotation of the motor shaft for the first number of degrees in the first direction relative to the starting position causes the flexible one-piece connecting rod to flex and push the valve inward into a first open configuration.

13. The system of claim 12, wherein rotation of the motor shaft for the second number of degrees in the second direction relative to the starting position causes the flexible one-piece connecting rod to flex and pull the valve outward into a second open configuration.

14. The system of claim 13, further comprising a valve block that houses at least a portion of the valve, wherein in the first open configuration air from an inlet port of the valve block travels to a first outlet port of the valve block.

15. The system of claim 14, wherein in the second open configuration air from the inlet port of the valve block travels to a second outlet port of the valve block.

16. The system of claim 11, wherein the first number of degrees relative to the starting position is between 53 degrees and 65 degrees.

17. The system of claim 11, wherein the first number of degrees relative to the starting position is 63 degrees.

18. The system of claim 15, wherein the second number of degrees relative to the starting position is 63 degrees.

19. The system of claim 11, wherein the valve is in a closed configuration when positioned at the starting position.

20. The system of claim 1, wherein a maximum deflection of the flexible one-piece connecting rod during translation of the valve is less than one degree.

* * * * *